US011218687B2

(12) United States Patent
Varekamp et al.

(10) Patent No.: US 11,218,687 B2
(45) Date of Patent: Jan. 4, 2022

(54) APPARATUS AND METHOD FOR GENERATING A REPRESENTATION OF A SCENE

(71) Applicant: KONINKLIJKE PHILIPS N.V., Eindhoven (NL)

(72) Inventors: Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/637,297

(22) PCT Filed: Aug. 7, 2018

(86) PCT No.: PCT/EP2018/071417
§ 371 (c)(1),
(2) Date: Feb. 7, 2020

(87) PCT Pub. No.: WO2019/030235
PCT Pub. Date: Feb. 14, 2019

(65) Prior Publication Data
US 2021/0152802 A1    May 20, 2021

(30) Foreign Application Priority Data

Aug. 8, 2017  (EP) .................................... 17185271

(51) Int. Cl.
*G01B 11/00* (2006.01)
*H04N 13/246* (2018.01)
(Continued)

(52) U.S. Cl.
CPC ........... *H04N 13/246* (2018.05); *G01S 17/89* (2013.01); *G06T 7/73* (2017.01); *G06T 7/80* (2017.01);
(Continued)

(58) Field of Classification Search
CPC .. H04N 13/111; H04N 13/243; H04N 13/156; H04N 13/271; H04N 2013/0081;
(Continued)

(56) References Cited

U.S. PATENT DOCUMENTS

| 7,319,479 B1* | 1/2008 | Crabtree ................... G01S 5/16 348/169 |
| 2009/0109280 A1* | 4/2009 | Gotsman ................... H04N 5/76 348/39 |

(Continued)

OTHER PUBLICATIONS

Katanacho et al "Surgical Navigation With QR Codes" Current Directions in Biomedical Engineering vol. 2, No. 1, Sep. 1, 2016 p. 355-358.

(Continued)

*Primary Examiner* — Howard D Brown, Jr.

(57) ABSTRACT

An apparatus comprises a receiver (401) receiving a first image and associated first depth data captured by a first depth-sensing camera. A detector (405) detects an image position property for a fiducial marker in the first image, the fiducial marker representing a placement of a second depth sensing image camera. A placement processor (407) determines a relative placement vector indicative of a placement of the second depth sensing image camera relative to the first depth-sensing camera in response to the image position property and depth data of the first depth data for an image position of the fiducial marker. A second receiver (403) receives a second image and second first depth data captured by the second depth sensing image camera. A generator (409) generates the representation of at least part the scene in response to a combination of at least the first image and the second image based on the relative placement vector.

20 Claims, 7 Drawing Sheets

(51) Int. Cl.
| | |
|---|---|
| *G01S 17/89* | (2020.01) |
| *G06T 7/80* | (2017.01) |
| *G06T 7/73* | (2017.01) |
| *H04N 13/156* | (2018.01) |
| *H04N 13/271* | (2018.01) |
| *H04N 13/243* | (2018.01) |
| *H04N 13/111* | (2018.01) |
| *G06T 17/00* | (2006.01) |
| *H04N 13/00* | (2018.01) |

(52) U.S. Cl.
CPC ............ *G06T 17/00* (2013.01); *H04N 13/111* (2018.05); *H04N 13/156* (2018.05); *H04N 13/243* (2018.05); *H04N 13/271* (2018.05); *G06T 2207/10028* (2013.01); *G06T 2207/20212* (2013.01); *G06T 2207/30168* (2013.01); *G06T 2207/30204* (2013.01); *G06T 2207/30244* (2013.01); *H04N 2013/0081* (2013.01)

(58) Field of Classification Search
CPC .. G06T 17/00; G06T 7/73; G06T 7/80; G06T 2207/10028; G06T 2207/20212; G06T 2207/30244; G06T 2207/30168; G06T 2207/30204

See application file for complete search history.

(56) References Cited

U.S. PATENT DOCUMENTS

| | | | |
|---|---|---|---|
| 2014/0028805 A1* | 1/2014 | Tohme | H04N 13/204 348/47 |
| 2017/0094251 A1* | 3/2017 | Wolke | H04N 13/246 |
| 2020/0064119 A1* | 2/2020 | Gordon | G01B 5/008 |

OTHER PUBLICATIONS

International Search Report and Written Opinion From PCT/EP2018/071417 dated Oct. 9, 2018.
Svoboda et al A Convenient Multi-Camera Self-Calibration for Virtual Environments, Presence, 2005.
Zhang "Camera Calibration with One-Dimensional Objects" IEEE Transactions on Pattern Analysis and Machine Intelligence vol. 26, No. 7, Jul. 2004.

* cited by examiner

APPARATUS AND METHOD FOR GENERATING A REPRESENTATION OF A SCENE

CROSS-REFERENCE TO PRIOR APPLICATIONS

This application is the U.S. National Phase application under 35 U.S.C. § 371 of International Application No. PCT/EP2018/071417, filed on Aug. 7, 2018, which claims the benefit of EP Patent Application No. EP 17185271.8, filed on Aug. 8, 2017. These applications are hereby incorporated by reference herein.

FIELD OF THE INVENTION

The invention relates to an apparatus and method for generating a representation of a scene from data captured by a plurality of depth-sensing cameras and in particular, but not exclusively, to generating an image for a virtual reality application from such a representation.

BACKGROUND OF THE INVENTION

Traditionally, technical processing and use of images has been based on two-dimensional imaging but increasingly the third dimension is being explicitly considered in image processing.

For example, three-dimensional (3D) displays have been developed which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In many embodiments, it may be desirable to generate view images for new viewing directions. Whereas various algorithms are known for generating such new view images based on image and depth information, they tend to be highly dependent on the accuracy of the provided (or derived) depth information.

Indeed, three-dimensional image information is often provided by a plurality of images corresponding to different view directions for a scene. Specifically, video content, such as films or television programs, are increasingly generated to include some 3D information. Such information can be captured using dedicated 3D or depth-sensing cameras, such as cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view directions, view point shifting processing may be employed. This is typically performed by a view shifting algorithm which uses an image for a single view direction together with associated depth information.

A particular example of an application that is based on three-dimensional image processing, is a virtual reality application. In typical virtual reality experiences, right eye and left eye view images may continuously be generated for e.g. a virtual reality headset to match the movement and change of orientation by the user. Such generation of dynamic virtual reality views is typically based on processing of 3D image data representing a given scene corresponding to the virtual reality environment. For example, a virtual reality server may generate view images for specific views based on a three-dimensional model or three-dimensional images, such as images represented by light intensity images and depth maps, or texture maps and depth meshes.

For applications such as virtual reality applications, a sequence of images may e.g. be generated to reflect a user's views as these change due to the user virtually moving or changing view direction/orientation in the virtual environment. In some applications, the images may be generated to reflect changes in the viewer's orientation but without supporting movement in the area. Video reflecting such a scenario is often referred to as omnidirectional video. In other applications, a moving viewing position may also be supported to reflect a user's virtual movement in the virtual reality environment. Video reflecting such a scenario is often referred to as immersive video. The current view of a user may be represented by a view vector which describes relevant positional and directional parameters for a viewpoint.

For omnidirectional video, a view vector typically describes an orientation according to three degrees of freedom (3DoF), typically by providing yaw, pitch and roll values (or azimuth, elevation, and tilt) or a quaternion representation.

For immersive video, a vector typically describes both an orientation and position according to six degrees of freedom (6DoF), typically by providing values for yaw, pitch, roll, and for three spatial dimensions.

However, a particular challenge when trying to develop and support flexible video and image applications supporting variable view positions and/or directions is that these are preferably not limited to a subset of positions and/or directions but all positions and/or directions are ideally supported. For example, for 6DoF immersive video, a viewer may be viewing the scene from any position and in any direction. This requires 3D information to be available for all parts of the scene and from all positions and for all directions. This requirement is difficult or impossible to meet in many practical applications, such as specifically applications wherein the 3D data is based on captures of a real-world scene.

The combination of the position and direction/orientation of an object is in the field typically referred to as a placement or a pose. Thus, a placement or pose vector may comprise six values/components with each value/component describing an individual property of the position/location or the orientation/direction of the corresponding object. Of course, in some situations, placement or pose vectors may have fewer components to represent the position and orientation, for example if one or more components are considered fixed (e.g. if all objects are considered to be at the same height and are level, four components may provide a full representation of the pose of an object).

One of the most difficult challenges to address is that of how to effectively capture a scene such that a representation of the scene can be generated which provides sufficient information to allow suitable viewpoint images of sufficiently high quality to be generated yet still allowing the representation to be easily communicated, stored, adapted, and/or processed.

Many applications are based on capturing a real-world scene or environment using depth-sensing cameras. This allows for visual properties to be captured together with three-dimensional information. In order to capture a scene sufficiently accurately and completely, the use of a plurality; and often a high number, of cameras is often adopted. In some applications, 10, 20 or even more cameras are used to provide a satisfactory capture.

The use of the captured information may be different in different applications. For example, in some embodiments, the captured data may be used to develop a three-dimensional model of the real-world scene. View images for a user being provided with a three-dimensional virtual reality experience may then be generated by evaluating the model from a specific viewpoint. In other applications, images for specific viewports or viewpoints may directly be generated from the captured images and depth information, e.g. by selecting one or more of the closest captured images and performing viewpoint shifting to correspond to the desired viewpoint.

Typically, calibration for multi-view camera capture systems includes different aspects:
1. Calibration of the parameters that are intrinsic to each of the camera sensors:
   a) Lens focal length and distortion model,
   b) Sensor size, resolution, position and orientation
2. Calibration of the parameters that are extrinsic to each camera, i.e. orientation and position of camera nodes with respect to each other.

In particular the second point is often difficult and critical. In order to accurately process the captured data e.g. to generate images for desired viewpoints, it is important that the placements of the depth-sensing cameras capturing the scene is known with a sufficiently high accuracy and reliability. In particular, it is typically required that the relative placements of the depth-sensing cameras with respect to each other is accurately known such that the capture data from different depth-sensing cameras can be reliably and accurately combined, whether by generating an intermediate model or by directly generating images from a plurality of the captured images. In many applications, the requirements for the placement determination are very demanding and difficult to achieve. For example, it is in many practical applications required that the accuracy on azimuth parameters is around 1°, or preferentially even substantially lower.

In some applications, accurate placement information can be ensured by a careful, accurate and highly controlled positioning and orientation of the cameras with known placement parameters. For example, a fixed rig of depth-sensing cameras where each camera is fixed at a known position and with a fixed orientation relative to the other cameras may be used. However, such an approach is impractical or even impossible in many applications. For example, if a large number of cameras are used and/or if cameras are far from each other, it is typically not practical to manually measure or restrict positions and orientations to a high degree of accuracy. Further, the approach is not suitable for dynamic capture applications, such as when cameras may be dynamically added or removed from the capture system, or where one or more of the cameras may be a moving camera.

It has been proposed to address such issues by introducing an automatic determination of the positions of the individual depth-sensing cameras. This may for example be achieved by use of specific position determining functionality being included in the depth-sensing cameras, such as e.g. GPS functionality. However, this not only requires the depth camera sensors to include such functionality, which may often not be the case in practice, but further tends to provide results that are far from sufficiently precise to ensure accurate determination between different cameras, especially for orientation values.

It has further been suggested that placement information may be derived from the captured information. Specifically, it has been proposed that image matching may be used to find overlapping image areas in images from different cameras and that this may further be used to derive information about the relative placements of the cameras. However, the approach tends to be computationally very intensive as the image matching needs to in principle consider all regions of an image relative to all other regions in all other captured images. Further, it has been found that the approach tends to give suboptimal and typically relatively inaccurate results. For example, it is difficult to prevent accidental matching between image regions that do not represent the same object but rather different objects that may have similar visual properties (or the same object from very different directions). Such mismatches may result in erroneous placement determination, which may result in significant errors when using this placement information to combine the data from different cameras.

Hence, an improved approach for capturing scenes, and specifically for determining placement information for capturing depth-sensing cameras, would be advantageous. In particular, an approach that allows improved operation, increased flexibility, facilitated implementation, facilitated operation, reduced complexity, reduced resource demand, improved accuracy, better placement determination, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided an apparatus for generating a representation of at least part of a scene from images of a scene captured by a plurality of distributed depth-sensing cameras, the apparatus comprising: a first receiver for receiving a first image captured by a first depth-sensing camera and first depth data captured by the first depth-sensing camera; a detector for detecting an image position property for a fiducial marker in the first image, the image position property being indicative of a position of the fiducial marker in the first image and the fiducial marker representing a placement of a second depth sensing image camera by having a predetermined placement difference with respect to the second depth sensing camera; a placement processor for determining a relative placement vector indicative of a placement of the second depth sensing image camera relative to the first depth-sensing camera in response to the image position property, and depth data of the first depth data for an image position of the fiducial marker, and the predetermined placement difference, the relative placement vector being at least three dimensional; a second receiver for receiving a second image captured by the second depth sensing image camera and second depth data captured by the second depth sensing image camera; a generator for generating the representation of at least part the scene in response to a combination of at least the first image and the second image based on the relative placement vector.

The invention may allow an improved and/or facilitated determination of placements of depth-sensing cameras capturing a scene thereby allowing an improved representation of the scene to be generated. In many embodiments and scenarios, a very accurate placement determination may be performed.

The approach may in embodiments facilitate placement of cameras and indeed in many applications no strict control or restriction on the placement will be necessary. The system may in many applications be able to automatically or semi-automatically adapt to the placements of the cameras. A substantially facilitated setup of a capturing system can often be achieved.

The approach may allow a dynamically varying capture configuration to be supported with e.g. cameras being dynamically introduced and/or removed, and or with cameras moving in the environment.

The approach may in many embodiments and scenarios allow a more accurate and/or complete capture and representation of the scene. Often a substantially more accurate combination of information from different cameras with different placements can be achieved.

The representation may be a data representation describing visual properties of at least part of the scene. Typically, the data representation may include three-dimensional data for the scene, such as e.g. depth information.

The representation of the scene may be at least one of a three dimensional model of the scene and a set of one or more images of the scene. The set of images may correspond to one or more images corresponding to viewports from different viewpoints. The representations may be generated e.g. as texture maps and associated maps, images and potentially associated depth maps, a three-dimensional structure and lighting data, etc.

Placement may refer to position and/or orientation. The relative placement vector may comprise one or more position values and/or one or more orientation values. In many embodiments, a placement vector may provide a three dimensional position and/or a three dimensional direction indication.

In many embodiments, the relative placement vector comprises at least three components, and/or may typically be indicative of both a relative position and a relative orientation between the first and second depth-sensing cameras.

An orientation may be given by one or more components selected from a pitch, yaw, roll components or from azimuth, elevation, and tilt components.

The relative placement vector may be indicative of a translation between a position of the first depth-sensing camera and a position of the second depth-sensing camera. The relative placement vector may be indicative of a direction from the first depth-sensing camera to the second depth-sensing camera.

The placement processor may be arranged to generate the relative placement vector based on an assumption of a known relationship between the fiducial marker and the second depth-sensing camera. It may specifically generate the relative placement vector based on an assumed relationship between a placement of the fiducial marker and a placement of the second depth-sensing camera. The placement processor may be arranged to generate the relative placement vector based on an assumed relationship between a position of the fiducial marker and a position of the second depth-sensing camera. The placement processor may be arranged to generate the relative placement vector based on an assumed relationship between an orientation of the fiducial marker and an orientation of the second depth-sensing camera.

The first and second depth-sensing cameras may be arranged to have an overlap of the viewports corresponding to the first image and the second image.

The first and second depth-sensing cameras may be part of a capture system comprising a plurality of spatially distributed depth-sensing cameras, with the cameras having different placements, such as different positions and/or orientations.

The relative placement vector may be indicative of position and/or orientation offsets or differences between the first and second depth sensing camera. The predetermined placement difference is indicative of a difference in the placements of the fiducial marker and the placement of the second depth sensing camera.

According to an optional feature of the invention, the generator is arranged to generate the representation as an image of the scene from a viewpoint different from viewpoints of the first depth-sensing camera and the second depth-sensing camera.

The approach may provide an improved generation of images of the scene, and may in particular often provide a higher quality and/or better coverage of the scene. The different viewpoints may have a different position and/or orientation.

According to an optional feature of the invention, the generator is arranged to combine at least the first image and the second image based on the first depth data and the second depth data.

This may provide improved performance in many embodiments, and may for example allow, improve, and/or facilitate viewpoint shifting for generating images from different viewpoints.

According to an optional feature of the invention, the generator comprises a receiver for receiving relative placement vectors for a plurality of pairs of depth-sensing cameras; a coordinate processor for determining depth-sensing camera placements in a common coordinate system for each of the plurality of cameras in response to the relative placement vectors, and wherein the generator is arranged to generate the image in response to the determined camera placements in the same coordinate system.

The approach may allow a flexible yet accurate scene capturing system to be developed. In particular, it may allow many cameras to effectively be combined into a coherent capture system providing enhanced coverage and/or improved quality. The approach may in particular facilitate or enable the interworking between a large number of cameras, and further may effectively support a changing configuration, e.g. due to cameras being added or removed, or due to moving cameras.

According to an optional feature of the invention, the coordinate processor is arranged to determine the depth-sensing camera placements in response to a minimization of a cost function, the cost function being dependent on a difference between the relative placement vectors and corresponding placement vectors determined from determined depth-sensing camera placements in the common coordinate system.

This may allow for a particularly efficient approach and may allow efficient combination of relative placement information from a large number of cameras to generate a coherent placement representation for the capture system.

In some embodiments, initial estimated camera placements may be determined by placement data determined without relying on the first image, such as for example a GPS position functionality.

According to an optional feature of the invention, the further comprises: a second detector for detecting a second image position property for a second fiducial marker in the second image, the second image position property being indicative of a position of the second fiducial marker in the second image the second fiducial marker representing a placement of the first depth sensing image camera by having a second predetermined placement difference with respect to the first depth sensing camera; and a second placement processor for determining a second relative placement vector indicative of a position of the first depth sensing image camera relative to the second depth-sensing camera in response to the second image position property and depth data of the second depth data for an image position of the second fiducial marker, and the second predetermined placement difference the second relative placement vector being at least three dimensional; and wherein the generator is further arranged to generate the representation in response to the second relative placement vector.

This may facilitate and/or improve the generation of the representation of the scene.

According to an optional feature of the invention, a visual property of the fiducial marker is indicative of an identity of the second depth-sensing camera, and the detector is arranged to determine the identity of the second depth-sensing camera in response to the visual property.

This may facilitate and/or improve the generation of the representation of the scene. It may in particular facilitate an automatic placement configuration determination for capturing systems comprising a large number of cameras.

The generator may be arranged to link the second image and the relative placement vector in response to the detected identity. The detector may be arranged to link the second image and the relative placement vector in response to the detected identity by selecting the second image from a plurality of received images based on the determined identity.

According to an optional feature of the invention, the relative placement vector comprises at least one orientation value.

This may provide improved performance in many scenarios. The at least one orientation value may be at least one of a roll, pitch, yaw, azimuth, elevation, and tilt value.

According to an optional feature of the invention, the placement processor is arranged to determine the at least one orientation value in response to a rotational variant visual property of the fiducial marker.

This may in many scenarios allow a reliable and low complexity determination of the orientation value while allowing typically relatively low complexity fiducial markers to be used.

According to an optional feature of the invention, the placement processor is arranged to determine the relative placement vector based on a predetermined assumption that at least one orientation parameter is identical for the first depth sensing image camera and the second depth sensing image camera.

This may provide improved performance in many scenarios and may facilitate operation substantially be reducing the degrees of uncertainty. The placement processor may specifically be arranged to determine the relative placement vector based on a predetermined assumption that the first depth sensing image camera and the second depth sensing image camera are both level/horizontal.

According to an optional feature of the invention, the apparatus further comprises a capture processor for determining a capture property of the scene in response to the relative placement vector, the capture property being indicative of how the scene is covered by the images captured by the plurality of depth-sensing cameras; and a user interface for generating a user output indicative of the capture property.

The apparatus may provide user feedback indicative of the coverage of the scene thereby e.g. assisting a user in setting up the capture configuration.

According to an optional feature of the invention, the capture processor is arranged to determine at least one part of the scene for which a capture quality indication indicates a reduced quality, and for generating a user output indicating a placement for a depth sensing image camera to capture the at least part of the scene.

The apparatus may provide use feedback indicative of the coverage of the scene thereby e.g. assisting a user in setting up the capture configuration by indicating advantageous positions for setting up the camera.

The capture quality indication may specifically be indicative of a number of cameras that capture different parts of the scene. An indication of an increasing number of capturing cameras may be indicative of an increasing quality. The capture processor may specifically be arranged to determine at least one part of the scene for which the capture quality indication indicates that a number of cameras capturing the scene is below a threshold. The user output may indicate a placement of the depth sensing image camera such that this will capture the part of the scene currently captured by less than the threshold of cameras. In some embodiments, the threshold may be one camera.

According to an optional feature of the invention, the generator is arranged to modify the relative placement vector in response to an image matching of the first image and the second image.

This may improve the accuracy of the resulting representation and may improve and/or facilitate the combination of the first image and the second image.

According to an optional feature of the invention, the generator is arranged to generate a three-dimensional model of the scene in response to the relative placement vector, the first image, and the second image.

This may provide improved and/or facilitated operation and/or performance. The generator may be arranged to generate the image in response to an evaluation of the three-dimensional model According to an aspect of the invention, there is provided a method of generating a representation of at least part of a scene from images of a scene captured by plurality of distributed depth-sensing cameras, the method comprising: receiving a first image captured by a first depth-sensing camera and first depth data captured by the first depth-sensing camera; detecting an image position property for a fiducial marker in the first image, the image position property being indicative of a position of the fiducial marker in the first image and the fiducial marker representing a placement of a second depth sensing image camera by having a predetermined placement difference with respect to the second depth sensing camera; determining a relative placement vector indicative of a placement of the second depth sensing image camera relative to the first depth-sensing camera in response to the image position property and depth data of the first depth data for an image position of the fiducial marker, and the predetermined placement difference, the relative placement vector being at least three dimensional; receiving a second image captured by the second depth sensing image camera and second depth data captured by the second depth sensing image camera; and generating the representation of at least part the scene in response to a combination of at least the first image and the second image based on the relative placement vector.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to generation of a data representation of a scene based on image (including video) captures from a plurality of distributed depth-sensing cameras, such as typically a capturing system comprising 10, 20 or even more cameras. However, it will be appreciated that the invention is applicable to many capturing systems including systems with only a few depth-sensing cameras capturing the scene.

Figure 1:
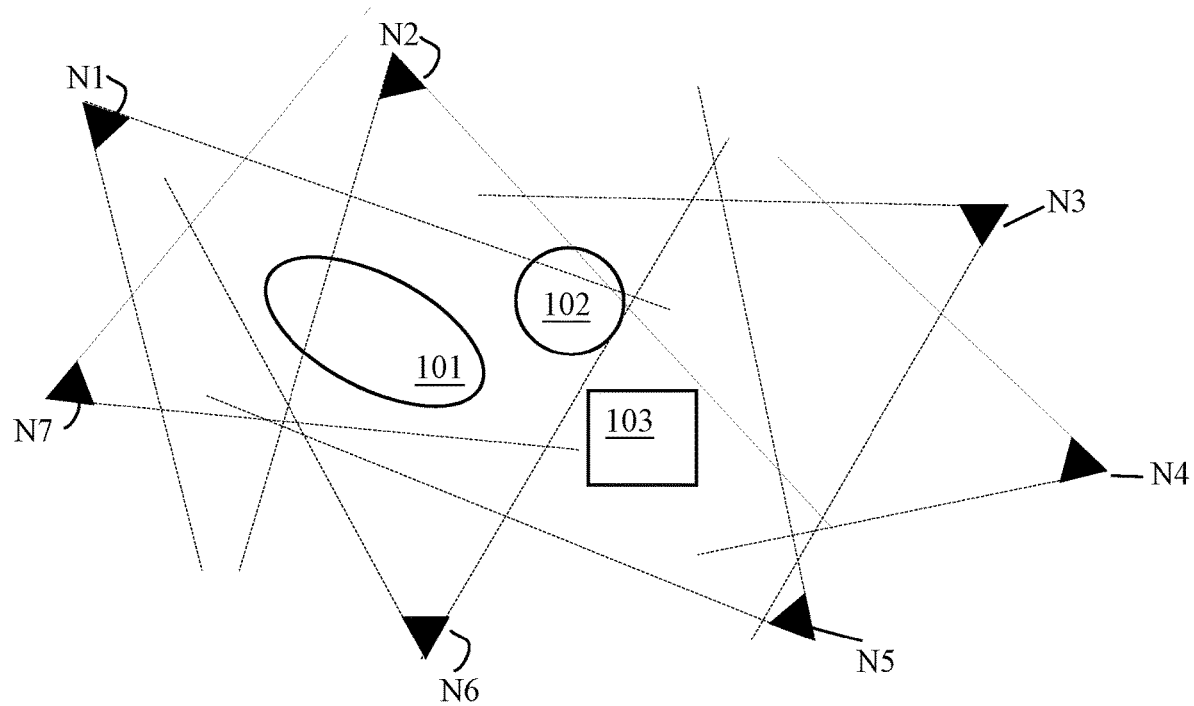
FIG. 1 illustrates an example of capture configuration comprising a plurality of depth-sensing cameras.

FIG. 1 illustrates an example of a capturing system wherein a relatively large number of depth-sensing cameras capture a scene, which in the example is represented by three central objects 101, 102 and 103. Each depth-sensing camera N1-N7 is represented by a black triangle also indicating the viewport/view angle of the camera. It should be noted that whereas FIG. 1 illustrates the use of eight cameras, a substantially larger number may be used in many practical systems, and indeed the illustrated eight cameras may be seen as representing a substantially larger number of cameras.

Depth-sensing cameras in the capture configuration are also referred to as nodes of the configuration and the determination of placement information (typically with reference to a common coordinate system) is known as registration of the cameras/nodes. Typically, the registration of nodes may be performed at a central server or registration unit which may gather the placement information for all nodes/cameras in the configuration.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

The use of a large number of cameras may substantially improve the capture of the scene and may specifically provide additional information, increased coverage etc. This may allow an improved generating of a data representation of the scene, e.g. as a set of images or as a three-dimensional model. However, in order to effectively combine the information provided by the individual camera, it is important that the specific placement of each camera is determined accurately. Thus, the registration data for each node must be accurate. In many embodiments, the accuracy of the orientation of the cameras must for example be in the order of only 1° or preferably even smaller. However, such a placement determination and registration for many cameras and high accuracy is often very difficult to achieve in practice.

For example, while three-dimensional scene structure information, such as e.g. measured by a time-of-flight or stereo camera node, may be used to register multiple nodes, it is typically very difficult to achieve accurate results in practice. E.g., in the example of FIG. 1, a scenario exists wherein a depth-sensing camera corresponding to node 1 (N1) and a depth-sensing camera corresponding to node 2 (N2) may both capture three dimensional information of the scene. For the cameras at node 1 and node 2 a calibration based on scene geometry alone may be possible using e.g. a point registration method that is robust to outliers (e.g. due to occlusion). Such a calibration method may be used to determine a rotation matrix and translation vector that transforms the coordinate system of node 2 into the coordinate system of node 1.

However, such a scene-based approach is difficult when trying to register node 1 with for instance node 3 since the cameras for these nodes see different sides of objects 1, 2 and 3, which means that there will be a very limited feature correspondence. Therefore, the relative placement of node 1 and node 3 is not practically feasible based on the capture of the scene as corresponding features of the scene are captured very differently by the two cameras, or indeed may not be captured by one of the cameras.

A possible solution may be to try out all pairs of nodes and see how successful the registration process is for each pair, and then only use pairs for which a successful registration is achieved. In practice, this will tend to result in a number of different problems, including it being very difficult to assess the quality of the registration process based on scene points alone.

Another drawback of relying on scene structure is that the 3D scene structure may not be very informative to the registration process and may not provide suitable information for matching different cameras/nodes. For example, if all that is visible in each viewport for a camera is a flat ground surface or reflective surfaces, then there is no scene structure to enable the placement determination. Although this may be mitigated by also using image texture to determine registration parameters, it still tends to lead to an inaccurate and/or unreliable registration.

In addition, such approaches tend to be complex and resource demanding and tend to be unsuitable for dynamically changing capture configurations, such as where cameras are added and removed. In particular, it tends to be unsuitable for capture scenarios where moving cameras are used, such as configurations using one or more cameras on a drone. For many such systems, registration/calibration must be performed not only in real-time but also with low latency (typically within 20 milliseconds).

Figure 2:
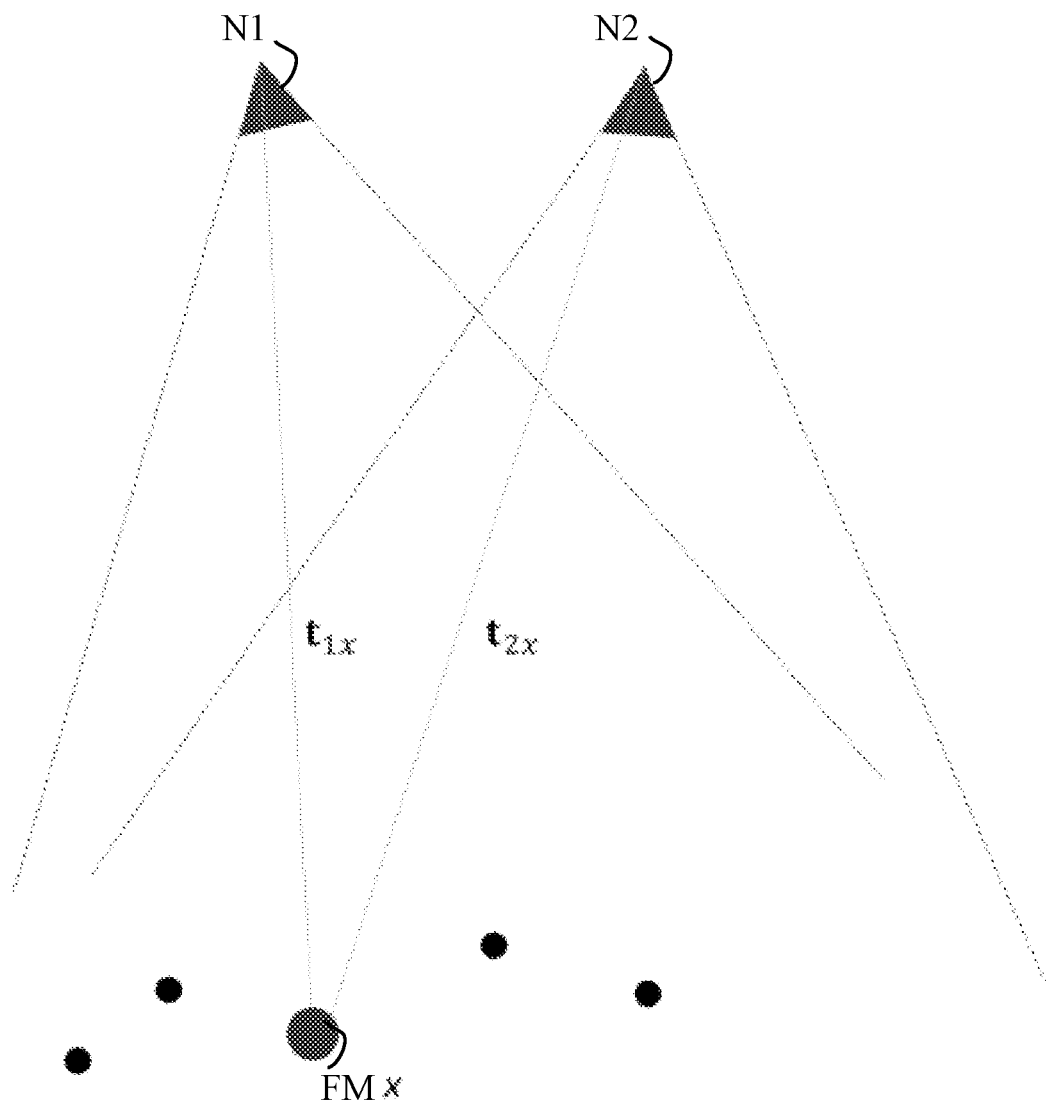
FIG. 2 illustrates an example of elements of a capture configuration comprising a plurality of depth-sensing cameras.

An approach that may facilitate registration/placement determination is to add markers at various positions in the scene such that these markers may be captured by the cameras. An example of such is illustrated in FIG. 2 which may represent a simple example of a range-sensing camera system with two camera nodes that observe a scene comprising a single marker. Both nodes observe a common scene including a marker, but not each other. However, based only on the depth measurement of the marker and knowledge of the intrinsic parameters of each camera, the cameras cannot be positioned in a common coordinate system, because (1) the rotations around the translation vectors are unknown, and (2) the angle between the translation vectors is unknown. It is thus impossible to merge captured 3D images of the two cameras.

In order to perform a registration between nodes 1 and 2, at least three fiducial markers should be visible to both nodes as there are three unknown parameters. However, this may not only make the capturing operation more difficult and cumbersome by requiring a large number of markers to be added but also tends to make these more obtrusive and noticeable.

In the following a specific approach will be used which may provide improved performance in many embodiments. In the example, the approach does not rely on scene structure alone but is based on using fiducial markers that are specifically linked with the placements of the depth-sensing cameras. A fiducial marker may be an object placed in the field of view of an imaging system such that it may appear in one or more of the images produced. The fiducial marker may be used by the system as a point of reference.

In the approach, the fiducial markers are not merely markers that may be detected and referenced in different images but rather are representative of the positions of the depth-sensing cameras.

In most embodiments, the fiducial markers may be co-located with the depth-sensing cameras, and specifically each camera may be provided with a fiducial marker. A fiducial marker may thus specifically be positioned at essentially the same position as a depth-sensing camera, and with an orientation that directly reflects the orientation of the depth-sensing camera.

The fiducial marker has a predetermined placement difference with respect to the corresponding depth sensing camera. The predetermined placement difference is thus a known/predetermined difference between the placement of the fiducial marker and the placement of the depth sensing camera. The predetermined placement difference may be a placement offset. The predetermined placement difference may specifically be a predetermined position offset (typically in two or three dimensions but in some embodiments the position offset may be in just one dimension). The predetermined placement difference may specifically be a predetermined orientation offset (typically in one, two or three dimensions).

In many embodiments, the fiducial marker may be placed directly on the depth sensing camera and the predetermined placement difference may often be zero, i.e. the placement of the fiducial marker is the same as the placement of the depth sensing camera. In other embodiments, the fiducial marker may for example be affixed to a tripod holding a camera and the predetermined placement difference reflects the positional and/or rotational/orientation offset between the fiducial marker and the depth sensing camera.

In many embodiments the predetermined placement difference may be e.g. a standardized or generally accepted approach for positioning fiducial markers with respect to depth sensing cameras, for example it may prescribed that fiducial markers are positioned on the camera with the same orientation as the camera (e.g. affixed to the surfaces also having the lens of the depth sensing camera.

In other embodiments, the predetermined placement difference may be determined during the setup and positioning of the fiducial markers. For example, in a given scenario, a user may decide that the fiducial markers are affixed to the tripod below the camera and may for example enter a corresponding value for the predetermined placement difference into the system for use in the subsequent calibration process (e.g. it may be entered that fiducial markers are affixed 20 cm below the depth sensing camera (lens)).

In many embodiments, the fiducial marker may be in a rigid alignment with the corresponding depth sensing camera. The fiducial marker may be comoving with the depth sensing camera, i.e. a change in the placement of the depth sensing camera will result in a corresponding change in the placement of the fiducial marker (and vice versa). The fiducial marker may have a fixed position and/or orientation with respect to/relative to the corresponding depth sensing camera. The predetermined placement difference may in some embodiments change between calibration sessions but will be known (or assumed to be known) prior to the start of the calibration process that determines the relative placement of the corresponding depth sensing camera based on the fiducial marker.

The predetermined placement difference may specifically be an assumed predetermined placement difference. For example, it may be prescribed that the fiducial markers should be positioned on the depth sensing cameras and therefore the predetermined placement difference will be indicative of this, i.e. it may specifically be zero. It is of course possible that a user (e.g. an uninformed assistant) may make a mistake and e.g. put the fiducial marker on the tripod holding the camera. The predetermined placement difference will still reflect the assumed correct placement of the fiducial marker, i.e. the predetermined placement difference may still be zero and the calibration will be performed using the (assumed) predetermined placement difference. In this case the predetermined placement difference thus reflects the correct placement difference between the fiducial marker and the depth sensing camera whereas the actual difference may be different. This may result in the calibration process determining positions of cameras (most likely) generating wrong, or at least inaccurate, estimated placements of the depth sensing cameras. However, it is of course not unexpected that erroneous results may result in a specific scenario wherein a mistake is made and the assumptions and premises on which the process is based are accordingly not met.

The predetermined placement difference may specifically in some embodiments be a placement difference vector indicative of an offset between the placement of the fiducial marker and of the corresponding depth sensing camera. For example, the predetermined placement difference may be represented by a six value vector indicating the offset in three positional dimensions and three orientation dimensions.

In this way, the determination of a placement of a given fiducial marker is accordingly also a determination of the placement of the corresponding depth-sensing camera.

As will be described in more detail later, the fiducial marker may in many embodiments be designed such that it can be used both for the identification of each depth sensing camera node and for the accurate registration of each node in a single common coordinate system.

Thus, a fiducial marker may specifically be positioned on or immediately adjacent to each camera to identify both the camera and the placement of the camera. The fiducial marker is accordingly representative of the placement of the depth-sensing camera linked to the fiducial marker by having a predetermined placement difference with respect to the depth sensing camera. In some embodiments, there may be a difference between the placement of the fiducial marker and the placement of the depth-sensing camera but this difference may be known to the system as it is a predetermined difference. Accordingly, if the difference between the placement of the fiducial marker and the placement of the depth-sensing camera is known, the determination of the placement of the fiducial marker inherently also determines the placement of the associated depth-sensing camera.

Different fiducial markers with different properties may be used in different embodiments, and fiducial markers may have various shapes for placement detection and node identification, including for example:

A combination of a sphere for positioning collocated with a (simple) QR-like code for identification.

Spheres of varying size, where the size is used as an identifier. Temporal averaging improves the accuracy of sphere-size estimation.

Spheres of varying size, color and/or pattern where these appearance variations are used as an identifier. Temporal aggregation of sphere identification probabilities may improve the accuracy of sphere-size estimation.

A set of fiducial markers as described above where the combination of markers uniquely identifies a camera node and provides a first of relative orientation.

A light emitting diode (LED) with a unique time code for identification. The LED may be white, RGB or IR depending on what type of camera sensors are in the camera system.

The approach may specifically be used to find relative placements between pairs of depth-sensing cameras, and in embodiments with larger number of cameras such relative placements may be generated for multiple pairs with the resulting relative placements subsequently being used to place all depth-sensing cameras in a common coordinate system.

Figure 3:
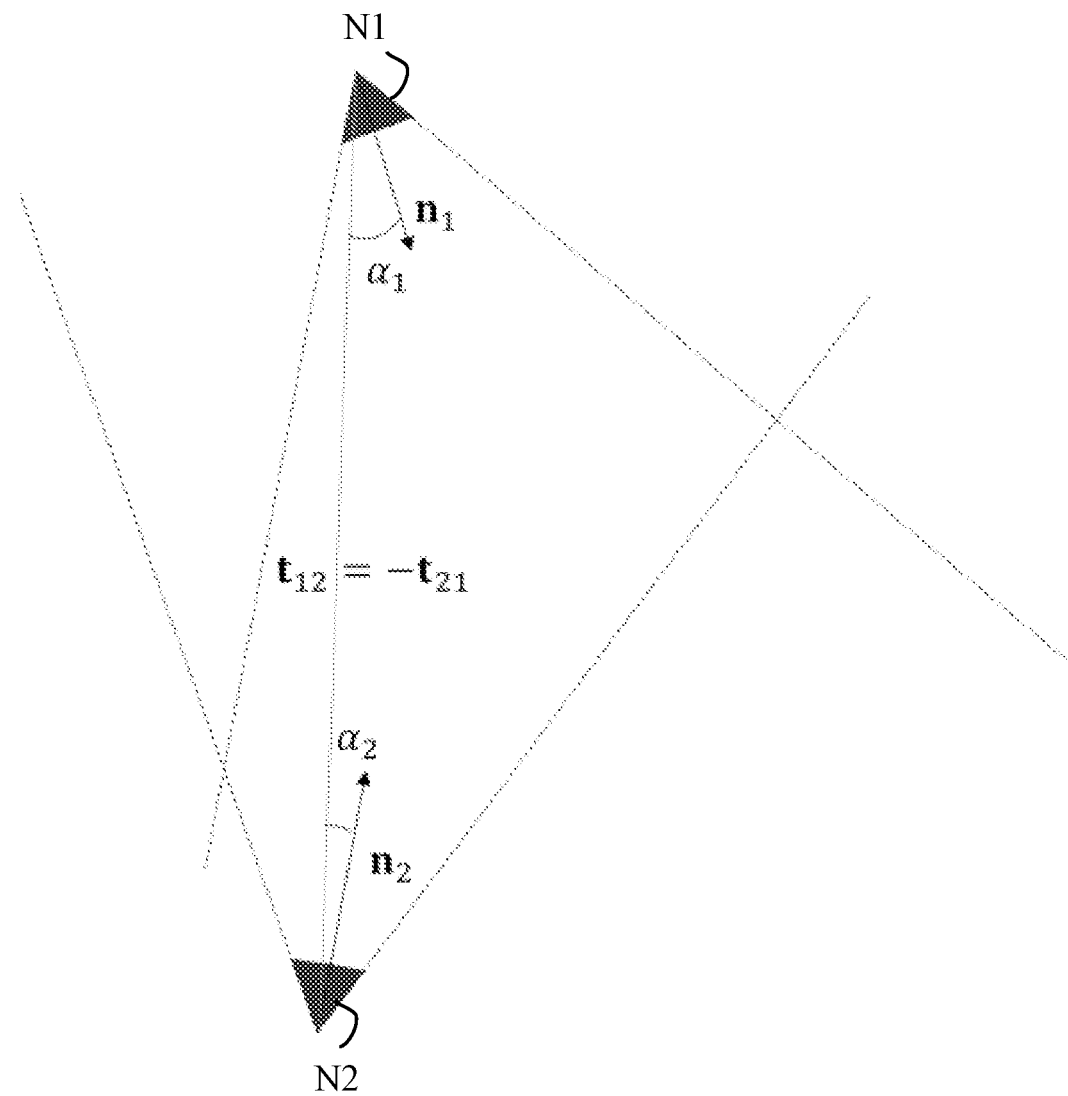
FIG. 3 illustrates an example of elements of a capture configuration comprising a plurality of depth-sensing cameras.

The approach for a pair of depth-sensing cameras/nodes may be illustrated by FIG. 3. The example illustrates a capture configuration consisting of two nodes with each having a fiducial marker for the purpose of identification and registration. The two depth-sensing cameras are positioned such that the nodes are in line-of-sight of each other. Since the sensors of the depth-sensing cameras observe each other, their relative placement can be determined without requiring other external markers. If the fiducial marker is indicative of the orientation of the camera, the relative orientation of one depth-sensing camera relative to the other can be determined. E.g. taking as a starting orientation, e.g. a 3D unit vector for node 1, the orientation of the line connecting both nodes relative to this vector ($\alpha 1$) can be determined using the intrinsic parameters for node 1. Finally, the orientation of node 2 can be determined relative to the connecting line ($\alpha 2$) using the intrinsic parameters for node 2.

The only remaining unknown is the common rotation of the cameras about the translation vector, i.e. the orientation of the camera pair configuration relative to the external environment/the common coordinate system. However, by accurately levelling the camera nodes or adding an external fiducial marker, this can also be determined and the placements of both depth-sensing cameras can be determined.

Figure 4:
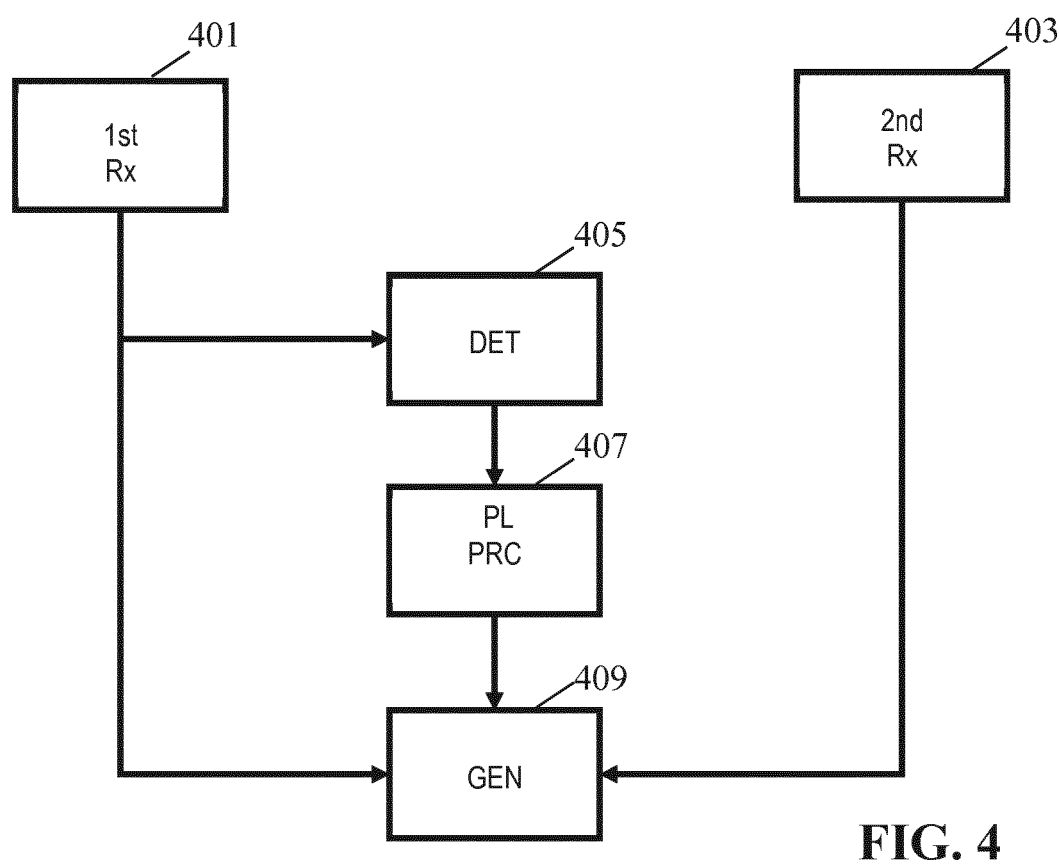
FIG. 4 illustrates an example of an apparatus in accordance with some embodiments of the invention.

FIG. 4 illustrates an example of an apparatus for generating a representation of at least part of a scene from images of the scene captured by a plurality of distributed depth-sensing cameras using the approach described above.

The apparatus comprises a first receiver 401 which is arranged to receive a first image and associated first depth data captured by a first depth-sensing camera. The first receiver 401 may thus be arranged to receive a first image captured by a first depth-sensing camera and first depth data captured by the first depth-sensing camera. For example, an image and associated depth map may be received from a stereo camera (after disparity estimation) or a range depth-sensing camera. The first depth-sensing camera may specifically correspond to node N1 of FIG. 3. The first depth data may be any data indicative of depth for the first image. The first depth data may be a depth map but could also be other depth data including for example a mesh based model or parallax information indicated by another image.

Similarly, the apparatus comprises a second receiver 403 which is arranged to receive a second image and associated second depth data captured by a second depth-sensing camera. The second receiver 403 may thus be arranged to receive a second image captured by the second depth sensing image camera and second depth data captured by the second depth sensing image camera. For example, an image and associated depth map may be received from a stereo camera (after disparity estimation) or a range depth-sensing camera. The second depth-sensing camera may specifically correspond to node N2 of FIG. 3. The second depth data may be any data indicative of depth for the second image. The second depth data may be a depth map but could also be other depth data including for example a mesh based model or parallax information indicated by another image.

The apparatus may be arranged to determine a relative placement vector indicating the placement of the second depth-sensing camera based on the image captured by the first depth-sensing camera, and specifically based on the detection of the fiducial marker of the second depth-sensing camera in the image captured by the first depth-sensing camera and on the associated depth data. The reference position parameter vector is further based on the predetermined placement difference, i.e. the determination is based on the predetermined knowledge of the placement of the fiducial marker with respect to the second depth sensing camera. In many embodiments, the predetermined placement difference may be zero and thus the reference position parameter vector may be determined based on the placement of the fiducial marker as the placement of the fiducial marker and the placement of the depth sensing camera is the same.

The first receiver 401 is coupled to a detector 405 which is arranged to detect an image position property for a fiducial marker in the first image. The image position property is indicative of a position of the fiducial marker in the first image.

The detector 405 may have information relating to the visual (and possibly depth) properties of the fiducial marker and may search the image for an object which corresponds to the visual (and possibly depth) properties of the fiducial marker. In many embodiments, the detector 405 may have a priori information of general visual properties of potential fiducial markers, and may specifically have information of common parameters for all fiducial markers. It may then search the image for an object having these properties and if found it will determine the corresponding image position. It may further proceed to analyze the specific properties of the fiducial marker to identify e.g. an orientation of the fiducial marker as well as a property indicating the identity of the camera that the fiducial marker is associated with, i.e. in the specific example the second depth-sensing camera.

In some embodiments, the detector 405 may additionally consider depth values of the corresponding depth map. For example, the fiducial marker may have a known 3D geometry/size and the detection of the fiducial marker may be facilitated and/or be made more accurate and/or reliable by also considering the depth map, and specifically if this exhibits characteristics that matches those expected for a fiducial marker.

The detector 405 may be considered to detect the image position property based on any of the information provided by the first depth-sensing camera. It may in many embodiments be based on only the first image, but more commonly it may also consider the depth information, which e.g. may be represented by a disparity between different cameras. As a specific example, based on an output from a stereo camera, the detector 405 may detect the marker in left and right image using texture alone and use disparity estimation on a per-marker level to reduce false alarms (by matching marker scale with disparity). One reason to do so might be that the full image dense disparity estimation algorithm that may be used for the final scene representation is too computationally intensive to run real-time.

The detector 405 is coupled to a placement processor 407 which is arranged to determine a relative placement vector which is indicative of the placement of the second depth sensing image camera relative to the depth first depth-sensing camera. The placement processor 407 further determines the relative placement vector based on the first depth data.

The determination is further based on the predetermined placement difference. This may be a direct consideration of the predetermined placement difference, e.g. by evaluating values of a predetermined placement difference vector. In other embodiments, the predetermined placement difference may be fixedly included in the determination method, e.g. by all determined positions of a fiducial marker being offset by a given value before being used further. In some embodiments, the predetermined placement difference is known to be zero and to correspond to the placements of the fiducial marker and the depth sensing camera being the same. In this case, the predetermined placement difference may inherently be included in determining the relative placement vector by the relative placement vector being determined for the fiducial marker and then also used for the depth sensing camera.

As an example, by analyzing the image position of the fiducial marker, the placement processor 407 can determine the direction in which the fiducial marker is found relative to the camera position as this depends on the mapping between the directions from the camera and image positions corresponding to these cameras. Accordingly, the image position may allow the placement processor 407 to calculate the relative direction from the first depth-sensing camera towards the fiducial marker and thus the second depth-sensing camera.

Furthermore, based on the first depth data, the estimated depth of the image object corresponding to the fiducial marker may be determined and from this the corresponding distance to the fiducial marker, and thus the second depth-sensing camera, may be determined. In this way, the relative direction and distance from the first depth-sensing camera to the second depth-sensing camera can be determined.

Further, if the fiducial marker is rotationally variant, i.e. a rotation around the determined direction results in a different appearance of the fiducial marker to the first depth-sensing camera, the placement processor 407 may detect the rotation of the fiducial marker in the image. Accordingly, it may determine the orientation of the second depth-sensing camera with respect to the first depth-sensing camera, and specifically the rotation of the second depth-sensing camera around the interconnecting line.

Thus, in some embodiments, the placement processor 407 may be arranged to determine the at least one orientation value in response to a rotational variant visual property of the fiducial marker. The rotational variant visual property may for example be provided as a rotationally variant pattern on a fiducial marker having a rotationally invariant shape.

The placement processor 407 may thus specifically determine a relative placement vector which defines both the relative position and the relative orientation of the second depth-sensing camera with respect to the first depth-sensing camera. The relative placement vector may specifically comprise three values indicating the relative position and one or more values indicating the relative orientation. The orientation may for example in some embodiments be provided as a single value indicating the relative rotation of the second depth-sensing camera with respect to the first depth-sensing camera in a pre-defined plane.

The relative placement vector accordingly provides at least a three-dimensional position difference between the first and second depth-sensing cameras. In addition, it will typically comprise at least one orientation value for the second camera.

The placement processor 407 may for example be arranged to determine a spatial position for the fiducial marker in response to a placement of the first depth sensing camera and a depth value of the first position of the fiducial marker in the first image. For example, the spatial position of the fiducial marker may be determined as the position of the first depth sensing camera offset by the depth value in the view direction/orientation of the first depth camera. The relative placement vector may then be determined by offsetting the spatial position of the fiducial marker by the predetermined placement difference.

The placement processor 407 is coupled to a generator 409 which is further coupled to the first receiver 401 and the second receiver 403. The generator 409 is fed the relative placement vector as well as the first and second images and typically also the first and second depth maps.

The generator 409 is arranged to generate a representation of at least part the scene in response to a combination of at least the first image and the second image based on the relative placement vector, and typically also based on the first and second depth maps.

In many embodiments, the representation of the (part of the) scene may be an image representation, and may specifically be one or more images corresponding to a viewport for a given viewpoint (or viewpoints). For example, based on the received first and second images and the relative placement vector, the image generator 105 may generate an image which shows the scene from a viewpoint in between the two cameras. In such a case, the two images may for example complement each other by one image providing information for areas that are occluded in the other image.

More generally, the relative placement vector may be used to position the first and second depth-sensing cameras in a coordinate system in which the viewpoint is also given. The generator 409 may then generate the image for the viewport of the viewpoint by view shifting based on the first and second images and based on the first and second depth maps.

As a specific example of the determination of the relative placement vector and the subsequent generation of an image, both depth maps may first be converted to a mesh, for instance by creating two triangles per square of 2×2 pixels of the depth map. The images from each camera can now directly serve as texture to synthesize the image of a new virtual view-point in between the two capture cameras. The result is two synthesized images, each one of these being warped from a different capture camera. The two synthesized images can be merged into a final image by analyzing the resulting depth buffers that are present in a graphics engine such as OpenGL or Vulkan. Analysis of the depth buffers after warping indicates which of the two synthesized views must be used. For instance, if the depth buffer of the first synthetic image is close to the camera than the second synthetic image, then the second synthetic image must be used at that pixel since it apparently imaged the de-occluded background texture.

In many embodiments, the apparatus may further be arranged to perform the reciprocal operation as well, i.e. it may determine a second relative placement vector which indicates the relative placement of the first depth-sensing camera as seen from the second depth-sensing camera. In such a case, the apparatus may accordingly comprise a second detector which repeats the operation of the detector 405 but instead seeks to detect a second fiducial marker that represents the position of the first depth-sensing camera in the second image. It may further comprise a second placement processor which repeats the operation of the placement processor 407 to determine the second relative placement vector from the images, depth data, a predetermined placement difference for the second fiducial marker with respect to the first depth sensing camera, a second predetermined and detected image position in the second image. It will be appreciated that the second a detector and the second placement processor may be implemented by the detector 405 and placement processor 407 of FIG. 4, respectively, repeating the same operation as when determining the first relative placement vector but swapping the first and second images as well as the first and second depth maps, and detecting the second fiducial marker rather than the first fiducial marker (in case individual fiducial marker searches are performed).

In such a case, reciprocal operation is thus performed with the relative placements of the first and second depth-sensing camera being determined both from the point of view of the first depth-sensing camera and from the point of view of the second depth-sensing camera.

The generator 409 may in such an embodiment proceed to use both the first and the second determined relative placement vectors to generate the representation and specifically the image for a different viewpoint. As an example, the generator 409 may proceed to determine an average relative placement vector from the first and second relative placement vectors and the generator 409 may then use this average relative placement vector for the image generation.

As mentioned previously, a capture configuration may in many embodiments include a large number of cameras, such as e.g. 10, 20 or even more than 50 cameras. In such a scenario, the approach described above for a pair of cameras may be repeated for a plurality of pairs of cameras with a plurality of interrelated relative placement vectors accordingly being generated. These interrelated relative placement vectors may then be processed to generate a representation of the scene, such as e.g. a set of images or in many embodiments a model of the scene.

In such a system, the apparatus may for example receive images and depth maps from all the depth-sensing cameras. It may then proceed to perform the process described above for all pairs of cameras. It may specifically generate two relative placement vectors for each pair, one based on each camera of the pair (or equivalently the different directions may be treated as different pairs with each resulting in one relative placement vector).

In such a system, it is typically unknown which cameras are visible to other cameras and the detector 405 may be arranged to perform the processing to address such uncertainty. For example, for a given first depth-sensing camera, the received first image may be processed for each of the possible other cameras. For example, each camera uploading an image and depth map may also upload a description of the fiducial marker attached to this camera. For a first camera, the detector 405 may then sequentially process the first image for all other cameras. It may specifically for a given camera search the image for a fiducial marker having properties corresponding to those reported by the given camera. If no match is found, the detector 405 proceeds to the next camera. However, if a match is found, the first camera proceeds to generate a relative placement vector as described above. After all potential cameras have been processed, the apparatus proceeds to the next camera and repeats the process.

In many embodiments, the detector 405 may instead search the image to find any image objects that may correspond to a fiducial marker, e.g. based on generic visual (and/or depth) properties for fiducial markers. For each detected potential fiducial marker, the detector 405 may then proceed to evaluate specific properties of the fiducial marker which may identify the camera associated with the fiducial marker. For example, a specific pattern (e.g. a QR code) may uniquely identify the detected fiducial marker/camera. Based on this detection, the apparatus may proceed to identify the received image and depth maps for the detected camera.

Identification may for instance be enabled by giving each fiducial marker a unique appearance (shape, color, pattern, etc.) or by using active (e.g. LED) markers that send identifying codes.

In this way, for each node/camera, a subset of the other nodes that are visible from the camera may be detected, and may then be both identified and located. Thus, for each node a set of relative placement vectors are generated which maps from this camera to other cameras. Specifically, the relative placement vector may include a translation vector indicative of the difference in position, and in addition at least one orientation/direction parameter may be included.

The process accordingly results in a typically large number of relative placement vectors being generated which reflect the relative placements of the cameras. Based on these relative placement vectors, the generator 409 may register the cameras in a common coordinate system. The registration process may for each node specifically determine a rotation matrix and a translation vector that places the nodes in a common coordinate system.

Figure 5:
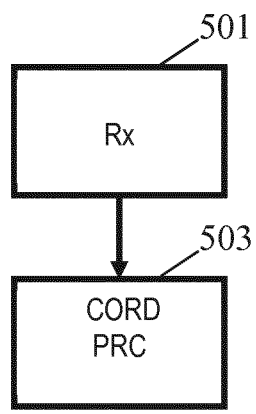
FIG. 5 illustrates an example of an apparatus in accordance with some embodiments of the invention.

As illustrated in FIG. 5, the generator 409 may comprise a receiver 501, which receives all the generated relative placement vectors. The receiver 501 is coupled to a coordinate processor 503, which is arranged to determine the camera placements in a common coordinate system based on the relative placement vectors. The generator 409 may then generate the representation of the scene from this configuration. For example, the representation may be provided as the combination of the registration data, i.e. data describing the position of all the cameras in a single coordinate system, together with the received images and depth maps.

Figure 6:
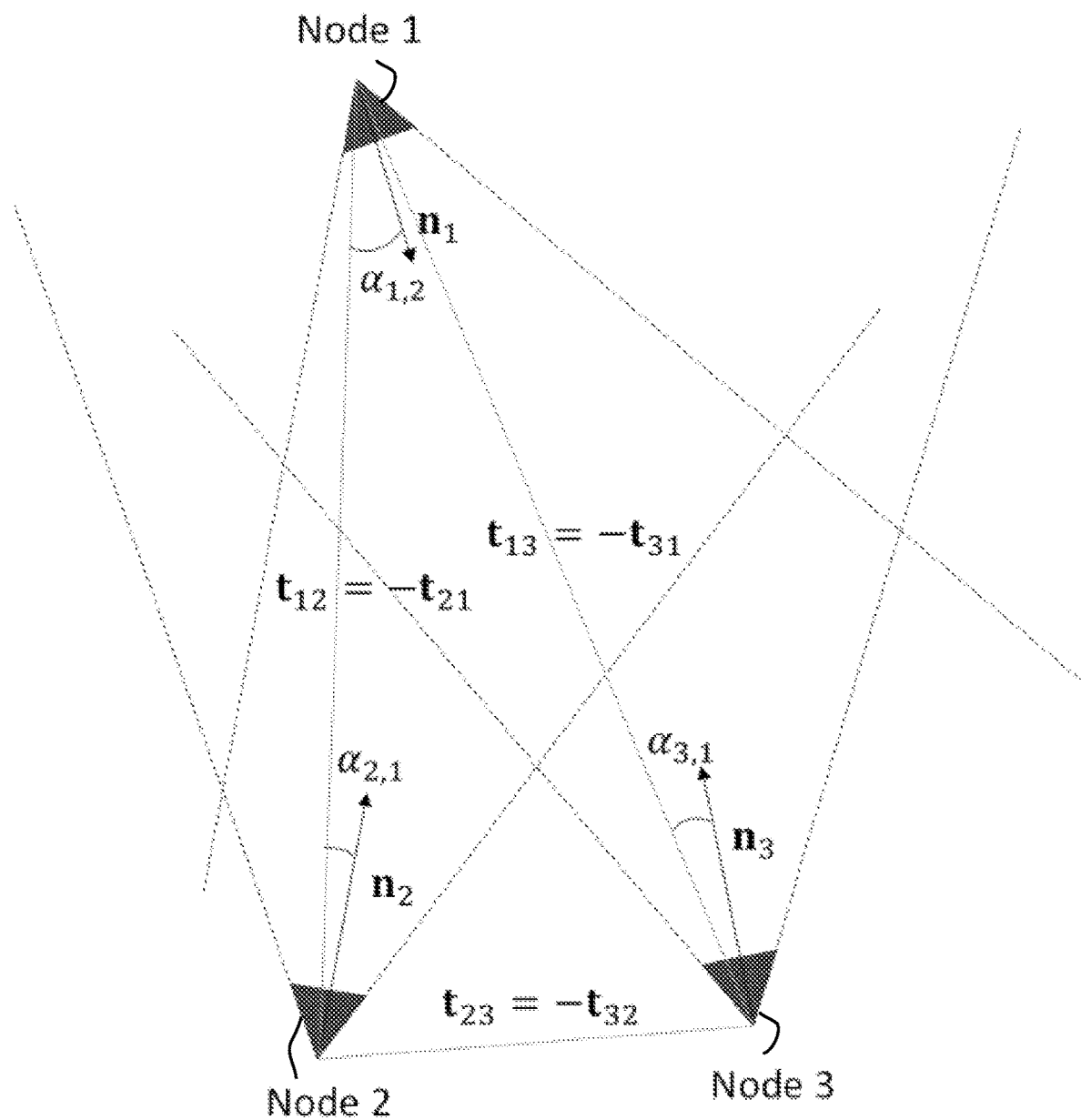
FIG. 6 illustrates an example of elements of a capture configuration comprising a plurality of depth-sensing cameras.

FIG. 6 illustrates an example of how a third camera may be registered. In the example, node 2 and 3 (N2, N3) may already be registered, i.e. their placements may be known. Further, the generator 409 may know the relative placement vectors of node 1 (N1) relative to nodes 2 and 3. Accordingly, the generator 409 knows the position of node 1 from either node 2 or node 3, and the 3D orientation of node 1 because node 1 observed node 2 and 3. Thus, the example shows a configuration of three nodes where node 1 sees two other nodes 2, 3 each having a fiducial marker for the purpose of identification and registration. Since nodes 2 and 3 can both determine their placement relative to node 1, the 3D data from all three nodes can be placed in a common coordinate system. Since node 1 observes the distance to both nodes 2 and 3, an extra check/filter operation is possible on the relative position determination of nodes 2 and 3.

Different approaches and algorithms may be used for determining the placements of the depth-sensing cameras in the common coordinate system. In many embodiments, the coordinate processor 503 may be arranged to perform a joint optimization process taking all the relative placement vectors into account.

Specifically, a cost function may be defined which is dependent on the differences between the (measured) relative placement vectors and corresponding (adjusted) relative placement vectors that result from the placements of the nodes in the common coordinate system.

Specifically, in the common coordinate system, an adjusted relative placement vector between two nodes results from the allocated placements of these two nodes. As the placements change, so do the adjusted relative placement vectors that indicate the difference between the allocated placements.

The cost function may include a comparison of this adjusted relative placement vector to the corresponding measured relative placement vector determined by the measurements as described previously. Thus, the adjusted relative placement vector resulting from the allocated placements of two cameras is compared to the measured relative placement vector for the two cameras, and the larger the difference, the larger the value of the cost function. The cost function may include a comparison for each of the measured relative placement vectors for all camera pairs.

The coordinate processor 503 may then vary the allocated placements to find an optimized allocation for which the cost function is minimized and the corresponding configuration may be registered.

It will be appreciated that various techniques and algorithms for such an optimization operation will be known to the skilled person and therefore will for brevity not be further described herein.

In many scenarios, the optimization may be assisted by other information. For example, initial positions of the nodes/cameras may be allocated based on other functionality, such as for example based on position information from GPS position estimates included in each camera.

In some embodiments, the placement processor 407 may be arranged to determine the relative placement vector based on a predetermined assumption that at least one orientation parameter is identical for the first depth sensing image camera and the second depth sensing image camera. For example, in many embodiments, the placement processor 407 may be based on assuming that the first and second cameras are both positioned such that they are level and fully horizontal.

Such an approach may allow the placement processor 407 to reduce the number of unknown variables and therefore may facilitate the determination of the relative placement vector. More significantly in many embodiments, it may facilitate the registration of the nodes in a common coordinate system. Specifically, it may allow for a more efficient optimization process where e.g. a simpler cost function can be used.

As a specific example, assume that we place each depth-sensing camera on a tripod with a fixed/nominal height and roughly level (e.g. roughly level as measured during placement using a traditional air bubble in a fluid approach). Since all cameras are at approximately the same (known) height above the ground surface and approximately level we can start an iterative search algorithm with two of the three orientation angles initialized at zero degree for each camera and also at the given height. The iterative cost minimization algorithm will thus be closer to the minimum and there are less unknowns to determine. This means that convergence will be faster. Moreover we can constrain the solution not to run too far from the known a-priori orientations and height.

As previously described, in many embodiments, the system may generate a representation of part of the scene by one or more images that are specifically generated from the captured images and depth information. Indeed, in some embodiments, the representation may simply be a single image of the scene generated from the captured images and depth maps, and based on combinations using the registration information. For example, a view shifting algorithm may be applied to one image with de-occluded areas being filled in from images from other cameras selected based on the placement information. In this way, an image from other viewpoints than the camera viewpoints can be generated.

As another example, in some embodiments, the generator 409 may be arranged to generate a three-dimensional model of the scene based on the relative placement vectors and specifically based on the configuration of all the cameras in the common coordinate system.

For example, each depth measurement of each camera can be used to fill a pre-defined 3D volume/array. After this filling operation, the collection of non-empty pixels form the 3D volumetric representation. The positions on the outer surface of the volume can converted to a mesh to represent the 3D model.

The distribution of the functionality of the described apparatus may be different in different embodiments depending on the preferences and requirements of the individual embodiment and application.

In some embodiments, the apparatus may be implemented as a stand-alone central device or server to which all the cameras transmit captured image and depth information. In other embodiments, the functionality may be distributed in the capturing system. For example, a detector 405 may be implemented in each camera and the detected image position may be communicated to a central device which implements the placement processor 407 and the generator 409, and which accordingly proceeds to generate the probability values and the representation. In yet other embodiments, a detector 405 and placement processor 407 may be implemented in each depth-sensing camera and the resulting relative placement vectors may be transmitted to generator 409, which may be centrally located.

Thus, the main description has focused on a network topology based on a master device that collects all data and registers the cameras. However, other alternatives may e.g. include:

Each camera has storage for video, and all processing including calibration is performed offline (after the recording).

Cameras communicate over RF (e.g. WiFi or Bluetooth) about their fiducial markers, and observed fiducial markers with positions. Together, the cameras form a common coordinate system, Mobile cameras (drones) broadcast position changes.

Figure 7:
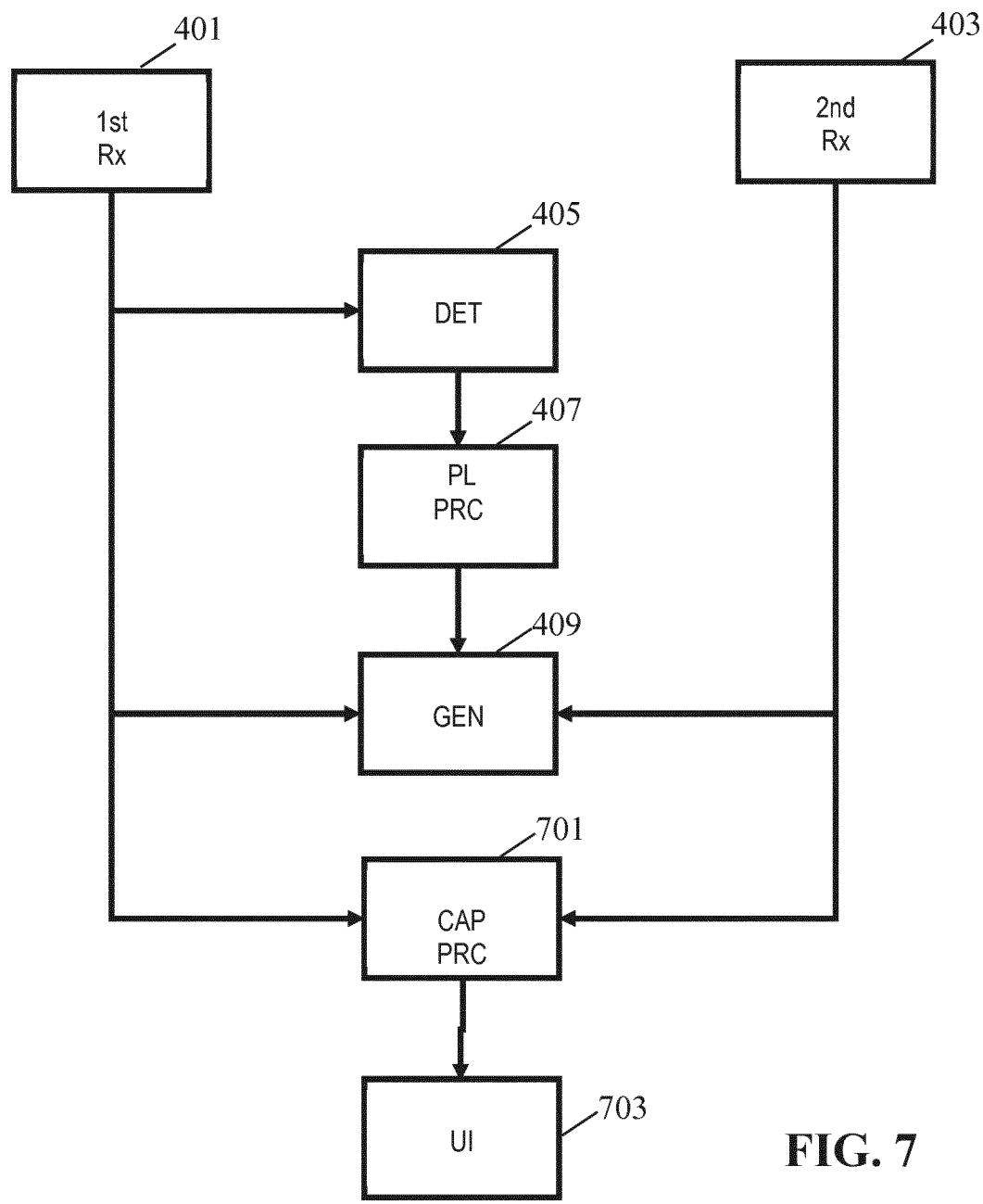
FIG. 7 illustrates an example of an apparatus in accordance with some embodiments of the invention.

As illustrated in FIG. 7, the apparatus may in some embodiments comprise a capture processor 701 for determining a capture property of the scene where the capture property is indicative of a coverage of the scene by the images captured by the plurality of depth-sensing cameras. The capture property may specifically indicate a capture quality.

It will be appreciated that the capture quality indication may be different in different embodiments and that different measures or parameters for assessing quality may be used in different embodiments. Specifically, in some embodiments, the capture quality indication may be an indication of the number of cameras of the configuration which capture the specific parts of the scene. For example, if, say, more than five cameras capture a specific part of a scene, the capture quality indication may indicate that the quality of capture for that part of the scene is at maximum. If no cameras capture a specific part of a scene, the capture quality indication may indicate that the quality of capture for that part of the scene is at minimum. For 1-4 cameras capturing the part of the scene, the capture quality indication may indicate intermediate quality levels. Thus, the capture quality indication may reflect the number of cameras capturing different parts of the scene, and thus may reflect that the more cameras that capture part of the scene the better is the capture quality, e.g. the lower is the risk of there being occluded elements.

In some embodiments, the capture quality indication may vary for different parts of the scene. In some embodiments, a single capture quality indication value may be generated for the scene as a whole, e.g. as an average number of cameras capturing part of the scene or as a proportion of the scene which is covered by fewer than a given number of cameras.

The capture processor 701 is coupled to a user interface 703 which may generate a user output indicative of the determined capture property, and specifically of the capture quality indication.

As a low complexity example, the apparatus may comprise a display on which the user interface 703 may present a simple indication of whether the overall capture quality is acceptable or not.

In some embodiments, the capture processor 701 may specifically identify parts of the scene for which the capture quality indication indicates a reduced quality of the capture. For example, it may identify the parts of the scene for which none or only one camera has captured the scene. It may then proceed to display these parts and may indicate a placement for a new depth-sensing camera such that this quality can be improved for that part of the scene.

In many embodiments, the user interface 703 may additionally or alternatively show the registration information, such as specifically the positions and orientations of the depth-sensing cameras in the common coordinate system.

Thus, in many embodiments, information on the identification and registration process may be made available to the user allowing adjustment to the position of the nodes, or additions of nodes, to improve the capture configuration.

The approach may specifically be used to check the validity/performance of a given camera setup.

For example, during installation of the camera system, objects in the scene can occlude another camera's fiducial marker. This can be detected automatically. It is also possible then to advice the person who installs the system where to place a next camera such that all cameras may be chained together. Given such a procedure it is possible to automatically detect whether or not a given camera node configuration may be suitable or not. The basis for this detection may be to determine whether both the position and the placement of the cameras allow full coverage of the scene. It may also be based on a detection of whether all cameras can be registered, i.e. whether the placements can be determined for all the cameras.

For an operator to quickly set-up a camera system, it is very useful to visualize any problems with the calibration process, and any opportunities to improve the quality by moving or adding camera nodes.

For the camera nodes that are successfully registered, it is possible to render them using computer graphics. Uncertainties in the registration can be visualized using blobs or lines or other graphics indicating the direction(s) of uncertainty. A suitable visualization may draw the camera frustum. This may be very useful as it provides the operator with information on the amount of camera overlap. Uncertainty can be indicated by blurring the rendering in that specific direction.

This visualization is more intuitive when rendered on a device that is also registered, preferably large field-of-view augmented reality glasses. A head mounted device (HMD) may e.g. be outfitted with camera sensors to capture the fiducial markers of the cameras. With online registration, the impact of changes to the camera systems may directly be visible.

A more advanced user interface based on virtual reality or augmented reality glasses may visualize how well each part of the scene is captured. This may involve generating a rendering of the captured 3D scene in alignment with the actual scene. This rendering can then be augmented with useful information such as:

Shadows to indicate lack of capturing,

The number of sensors that capture a scene element (if any),

Given the surface properties of the object, whether sufficient sensors are capturing this object.

In some embodiments, the generator 409 may further be arranged to modify the relative placement vector, and more specifically a coordinate in the common coordinate system, after the determination based on fiducial markers. In particular, it may apply a fine adjustment based on image matching between captured the images.

For example, for the first and second depth-sensing camera, the fiducial marker based registration may result in the placement of the first and second cameras. It may then proceed to match the first and second image taking into account the difference in positions. For example, image shifting of both images to a common central viewpoint may be performed. Ideally, these two images should now match. However, in practice, this will not be exactly the case, and the generator 409 may in some cases then try to see if the matching is better for slight changes in the placement vectors. If so, the modified placements resulting in the best image match may replace the original placements determined from the consideration of the fiducial markers.

In many embodiments, the approach may advantageously be used in a dynamic capture system, such as e.g. in a video capture system wherein e.g. moving video cameras are used. In such systems, timing synchronization between different cameras and images may also be required. This may for example be achieved by placement data, images etc. having associated time codes. In many systems, all cameras may e.g. be time synchronized to a common time base, e.g. based on GPS or similar time synchronization. In such systems, the time codes may e.g. be used to coordinate which images are used for placement data for a specific time instant etc.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:
a first receiver circuit,
wherein the first receiver circuit is arranged to receive a first image captured by a first depth-sensing camera and a first depth data captured by the first depth-sensing camera,
wherein the first depth-sensing camera is one of a plurality of distributed depth-sensing cameras;
a detector circuit,
wherein the detector circuit is arranged to detect an image position property for a fiducial marker in the first image,
wherein the image position property is indicative of a position of the fiducial marker in the first image,
wherein the fiducial marker represents a placement of a second depth-sensing camera by having a predetermined placement difference with respect to the second depth sensing camera;
a placement processor circuit,
wherein the placement processor circuit is arranged to determine a relative placement vector,
wherein the relative placement vector is indicative of a placement of the second depth-sensing camera relative to the first depth-sensing camera in response to the image position property, and a depth data of the first depth data for an image position of the fiducial marker, and the predetermined placement difference,
wherein the relative placement vector is at least three dimensional;
a second receiver circuit, wherein the second receiver circuit is arranged to receive a second image captured by the second depth sensing camera and second depth data captured by the second depth sensing camera,
wherein the second depth-sensing camera is one of the plurality of distributed depth-sensing cameras; and
a generator circuit, wherein the generator circuit is arranged to generate a representation of at least part of a scene in response to a combination of at least the first image and the second image based on the relative placement vector,
wherein the images of the scene are captured by the plurality of distributed depth-sensing cameras.

2. The apparatus of claim 1, wherein the generator circuit is arranged to generate the representation so as to comprise an image of the scene from a viewpoint different from viewpoints of the first depth-sensing camera and the second depth-sensing camera.

3. The apparatus of claim 1, wherein the generator circuit is arranged to combine the first image and the second image based on the first depth data and the second depth data.

4. The apparatus of claim 1, further comprising a coordinate processor circuit,
wherein the coordinate processor circuit is arranged to determine depth-sensing camera placements in a common coordinate system for each of the plurality of depth-sensing cameras in response to relative placement vectors,
wherein the plurality of depth-sensing cameras comprise a plurality of pairs of depth-sensing cameras,
wherein the generator circuit comprises a placement receiver circuit,
wherein the placement receiver circuit is arranged to receive relative placement vectors for the plurality of pairs of depth-sensing cameras,
wherein the generator circuit is arranged to generate the image in response to the camera placements in the common coordinate system.

5. The apparatus of claim 4,
wherein the coordinate processor circuit is arranged to determine the depth-sensing camera placements in response to a minimization of a cost function,
wherein the cost function is dependent on a difference between the relative placement vectors and corresponding placement vectors determined from depth-sensing camera placements in the common coordinate system.

6. The apparatus of claim 1, further comprising:
a second detector circuit, wherein the second detector is arranged to detect a second image position property for a second fiducial marker in the second image,
wherein the second image position property is indicative of a position of the second fiducial marker in the second image,
wherein the second fiducial marker represents a placement of the first depth sensing camera by having a second predetermined placement difference with respect to the first depth sensing camera; and
a second placement processor circuit,
wherein the second placement processor circuit is arranged to determine a second relative placement vector indicative of a position of the first depth-sensing camera relative to the second depth-sensing camera in response to the second image position property and depth data of the second depth data for an image position of the second fiducial marker,
wherein the second predetermined placement difference the second relative placement vector is at least three dimensional,
wherein the generator circuit is arranged to generate the representation in response to the second relative placement vector.

7. The apparatus of claim 1,
wherein a visual property of the fiducial marker is indicative of an identity of the second depth-sensing camera,
wherein the detector circuit is arranged to determine the identity of the second depth-sensing camera in response to the visual property.

8. The apparatus of claim 1, wherein the relative placement vector comprises at least one orientation value.

9. The apparatus of claim 8, wherein the placement processor circuit is arranged to determine the at least one orientation value in response to a rotational variant visual property of the fiducial marker.

10. The apparatus of claim 1, wherein the placement processor circuit is arranged to determine the relative placement vector based on a predetermined assumption that at least one orientation parameter is identical for the first depth sensing camera and the second depth sensing camera.

11. The apparatus of claim 1, further comprising:
a capture processor circuit,
wherein the capture processor circuit is arranged to determine a capture property of the scene in response to the relative placement vector,
wherein the capture property is indicative of how the scene is covered by the images captured by the plurality of depth-sensing cameras; and
a user interface, wherein the user interface is arranged to generate a user output indicative of the capture property.

12. The apparatus of claim 11,
wherein the capture processor circuit is arranged to determine at least one part of the scene for which a capture quality indication indicates a reduced quality,
wherein the capture processor circuit is arranged to generate a user output indicating a placement for a depth sensing camera to capture the at least part of the scene.

13. The apparatus of claim 1, wherein the generator circuit is arranged to modify the relative placement vector in response to an image matching of the first image and the second image.

14. The apparatus of claim 1, wherein the generator circuit is arranged to generate a three-dimensional model of the scene in response to the relative placement vector, the first image, and the second image.

15. A method of generating a representation of at least part of a scene, the method comprising:
receiving a first image captured by a first depth-sensing camera;
receiving a first depth data captured by the first depth-sensing camera,
wherein the first depth-sensing camera is one of a plurality of distributed depth-sensing cameras;
detecting an image position property for a fiducial marker in the first image,
wherein the image position property is indicative of a position of the fiducial marker in the first image,
wherein the fiducial marker represents a placement of a second-depth sensing camera by having a predetermined placement difference with respect to the second depth-sensing camera;
determining a relative placement vector,
wherein the relative placement vector is indicative of a placement of the second depth-sensing camera relative to the first depth-sensing camera in response to the image position property and a depth data of the first depth data for an image position of the fiducial marker, and the predetermined placement difference,
wherein the relative placement vector is at least three dimensional;
receiving a second image captured by the second depth-sensing camera and second depth data captured by the second depth-sensing camera, wherein the second depth-sensing camera is one of the plurality of distributed depth-sensing cameras; and
generating the representation of at least part the scene in response to a combination of at least the first image and the second image based on the relative placement vector.

16. The method of claim 15, wherein the generating is arranged to generate the representation so as to comprise an image of the scene from a viewpoint different from viewpoints of the first depth-sensing camera and the second depth-sensing camera.

17. The method of claim 15, wherein the generating is arranged to combine the first image and the second image based on the first depth data and the second depth data.

18. The method of claim 15, further comprising:
determining depth-sensing camera placements in a common coordinate system for each of the plurality of depth-sensing cameras in response to relative placement vectors,
wherein the plurality of depth-sensing cameras comprise a plurality of pairs of depth-sensing cameras; and
receiving relative placement vectors for the plurality of pairs of depth-sensing cameras,
wherein the generating is arranged to generate the image in response to the camera placements in the common coordinate system.

19. The method of claim 18, further comprising:
determining the depth-sensing camera placements in response to a minimization of a cost function,
wherein the cost function is dependent on a difference between the relative placement vectors and corresponding placement vectors determined from depth-sensing camera placements in the common coordinate system.

20. The method of claim 15, further comprising:
detecting a second image position property for a second fiducial marker in the second image,
wherein the second image position property is indicative of a position of the second fiducial marker in the second image, wherein the second fiducial marker represents a placement of the first depth sensing camera by having a second predetermined placement difference with respect to the first depth sensing camera; and determining a second relative placement vector indicative of a position of the first depth sensing camera relative to the second depth-sensing camera in response to the second image position property and depth data of the second depth data for an image position of the second fiducial marker, wherein the second predetermined placement difference the second relative placement vector is at least three dimensional, wherein the generating is arranged to generate the representation in response to the second relative placement vector.

* * * * *